Nov. 19, 1929.　　　　E. DALAND　　　　1,735,852
LANDING GEAR FOR AIRPLANES
Filed Aug. 16, 1923　　2 Sheets-Sheet 2
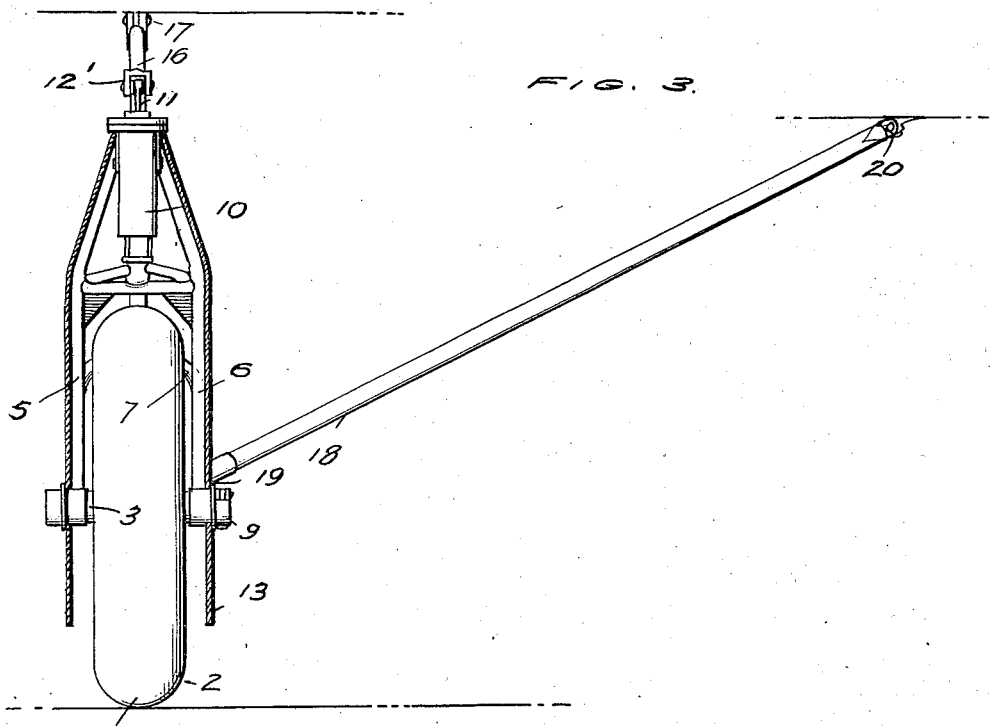
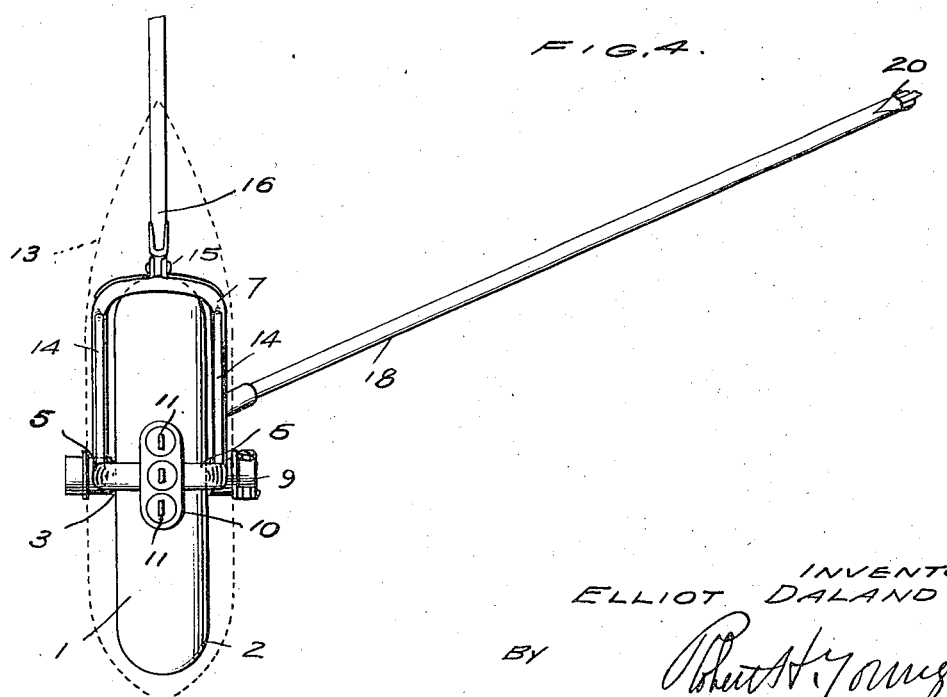
INVENTOR
ELLIOT DALAND
BY
ATTORNEY Patented Nov. 19, 1929

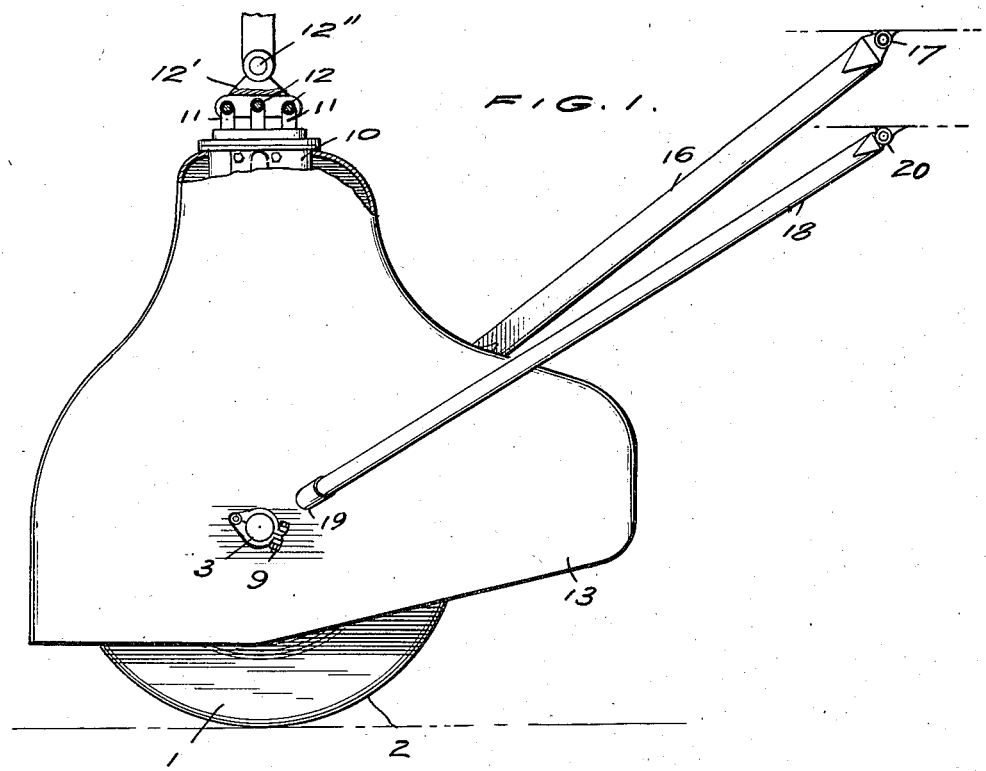
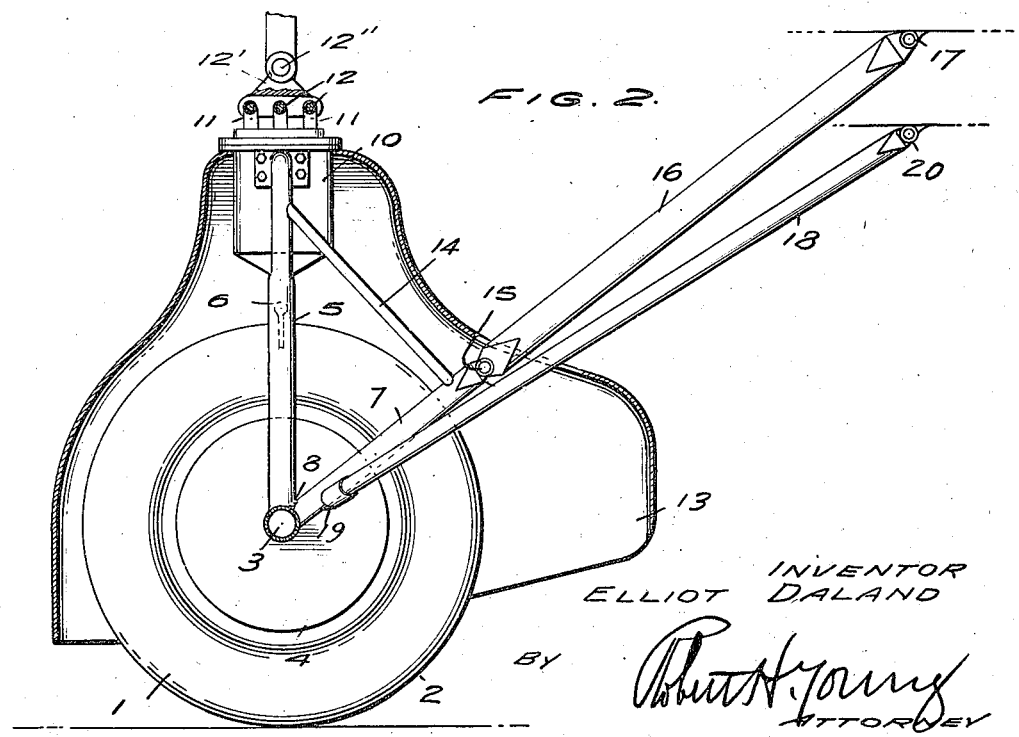

1,735,852

UNITED STATES PATENT OFFICE

ELLIOT DALAND, OF TORRESDALE, PENNSYLVANIA, ASSIGNOR TO KEYSTONE AIRCRAFT CORPORATION, OF BRISTOL, PENNSYLVANIA, A CORPORATION OF DELAWARE

LANDING GEAR FOR AIRPLANES

Application filed August 16, 1928. Serial No. 300,088.

This invention relates to landing gear for airplanes, and has for its object to provide a device of this class which is so constructed that the moment from the side load is rigidly resisted and a constant direction of wheel axles is maintained.

A further object of the invention is to provide a construction which permits the entire wheel gear to be effectively inclosed in a streamline casing for reducing air resistance.

A further object of the invention is to provide a construction which permits a wheel axle of minimum length so as to relieve the struts from excessive bending moment and thereby enables them to be constructed of less weight than is ordinarily required.

A further object of the invention is to provide a construction in which the motion of the wheels are substantially vertical, thereby relieving the tires and structure from side loads.

With these objects in view the invention consists of the construction and arrangement of the wheel frames and struts and in certain combinations of the same with the shock absorbing elements, all of which will be first fully described and afterwards specifically pointed out in the appended claims.

Referring to the accompanying drawings which illustrate only one half of the landing gear;

Fig. 1 is a side elevation of the landing gear taken from the outside and showing the casing in vertical section;

Fig. 2 is a similar view of the landing gear taken from the inside;

Fig. 3 is a front elevation of the same, the casing being shown in section; and

Fig. 4 is a top plan view of the landing gear, the casing being shown in dotted lines.

Like numerals of reference indicate the same parts throughout the several figures, in which:

1 indicates one wheel of the landing gear and 2 is the tire therefor.

3 indicates the wheel axle having a brake plate 4 welded thereto.

5 indicates the wheel yoke mounting which includes the vertical yoke member 6 and the rearwardly and upwardly extending yoke member 7, the two having their lower ends welded together at 8 and mounting the split axle retaining clamp 9, which receive and rigidly clamp the axle 3 against rotation.

The vertical yoke member 6 is rigidly attached to a shock absorbing cylinder 10, from which cylinder piston rods 11 extend upwardly, which piston rods are provided with holes 12 to receive pins for connection to a casting 12′ which is provided with a hole to receive a pin 12″ for connection to the structure of the airplane, suitably mounted on the shock absorbing cylinder and enveloping the structure just described in a streamline casing 13.

Connecting both yoke members 6 and 7 near their upper ends are tubes 14 having for their purpose to take the braking torque which is communicated to the yoke mounting 5 from the axle through the clamps 9.

Connecting with the yoke member 7, by a pin joint 15 is the rearwardly and upwardly extending strut 16, which is also connected by a pin joint 17 to the airplane structure some distance in rear of the wheel 1.

Referring now to Figures 1, 2 and 4, it will be seen that an inwardly, rearwardly and upwardly extending tube or strut 18 is attached to the yoke mounting at 19, which functions to take the side loads imparted to the wheel. This tube or strut 18 is connected to the structure of the airplane by means of a pin joint 20.

Having thus described the several parts of the invention the action and operation of the same will be perfectly clear to those skilled in the art.

When the gear is being subjected to the stresses and strains of landing or taxiing, the shock absorbing element 10, to relieve the shock and take the vertical load, while the pin joints provided at all points of connection between the landing gear and the airplane structure permits the struts to take the backward and side loads without imparting any excessive bending moments thereto, while the torque load imparted to the tubes 14 is distributed over the two strut members 6 and 7 of the strut mounting 5.

It is also seen that this construction makes it possible to take the brake torque moment with less material and weight as ordinarily required, as the tube 18 is relieved of all bending tendency and at the same time maintains a rigid mounting for the axle and does not allow a change in its direction.

Having thus fully described the invention, what I claim as new and desire to secure by Letters Patent of the United States is:

1. A landing gear for airplanes including a wheel and axle, a brake element on the axle, a yoke mounting for the wheel, means for clamping the axle rigidly in the yoke mounting, said yoke mounting including a vertical yoke member and a rearwardly and upwardly extending yoke member, a shock absorber fixed to the vertical yoke member and including a piston having means for effecting a pin joint with the structure of an airplane, a rearwardly and upwardly extending strut having means for effecting a pin joint with the rearwardly and upwardly extending yoke member, and having means at its upper end for effecting a pin joint with the structure of an airplane, tubes connecting the two yoke members near the upper ends thereof, and an inwardly, rearwardly and upwardly extending strut connected to said yoke mounting and having means for effecting a pin joint with the structure of an airplane.

2. A landing gear for airplanes including a wheel and axle, a brake element on the axle a yoke mounting for the wheel, means for clamping the axle rigidly in the yoke mounting, said yoke mounting including a vertical yoke member and a rearwardly and upwardly extending yoke member, a shock absorber fixed to the vertical yoke member and including a piston having means for effecting a pin joint with the structure of an airplane, a rearwardly and upwardly extending strut having means for effecting a pin joint with the rearwardly and upwardly extending yoke member, and having means at its upper end for effecting a pin joint with the structure of an airplane, tubes connecting the two yoke members near the upper ends thereof, and an inwardly, rearwardly and upwardly extending strut connected to said yoke mounting and having means for effecting a pin joint with the structure of an airplane and a casing for the wheel and yoke mounting.

3. A landing gear for airplanes, including a wheel and axle, a brake element on the axle, a yoke mounting for the wheel, means on the yoke mounting for receiving the axle, said yoke mounting including a vertical yoke member, a shock absorber thereon having means to effect a pin joint with the structure of an airplane, a rearwardly and upwardly extending yoke member, a strut having means for effecting a pin joint with the rearwardly and upwardly extending yoke member and having means at its upper end for effecting a pin joint with the structure of an airplane, tubes connecting the two yoke members near the upper ends thereof, and an inwardly, rearwardly and upwardly extending strut connected to said yoke mounting and having means for effecting a pin joint with the structure of an airplane.

4. A landing gear for airplanes, including a wheel and axle, a brake element on the axle, a yoke mounting for the wheel, means on the yoke mounting for receiving the axle, said yoke mounting including a vertical yoke member, a shock absorber thereon having means to effect a pin joint with the structure of an airplane, a rearwardly and upwardly extending yoke member, a strut having means for effecting a pin joint with the rearwardly and upwardly extending yoke member and having means at its upper end for effecting a pin joint with the structure of an airplane, tubes connecting the two yoke members near the upper ends thereof, and an inwardly, rearwardly and upwardly extending strut connected to said yoke mounting and having means for effecting a pin joint with the structure of an airplane and a casing for the wheel and yoke mounting.

5. A landing gear for airplanes including a wheel and axle, a brake element on the axle, a yoke mounting for the wheel, means on the yoke mounting to receive the axle, said yoke mounting including a vertical yoke member a shock absorber thereon having means to effect a pin joint with the structure of an airplane, a rearwardly and upwardly extending yoke member, a rearwardly and upwardly extending strut having means for effecting a pin joint with the rearwardly and upwardly extending yoke member and having means at its upper end for effecting a pin joint with the structure of an airplane, and an inwardly, rearwardly and upwardly extending strut connected to said yoke mounting and having means for effecting a pin joint with the structure of an airplane.

6. A landing gear for airplanes including a wheel and axle, a brake element on the axle, a yoke mounting for the wheel, means on the yoke mounting to receive the axle, said yoke mounting including a vertical yoke member a shock absorber thereon having means to effect a pin joint with the structure of an airplane, a rearwardly and upwardly extending yoke member, a rearwardly and upwardly extending strut having means for effecting a pin joint with the rearwardly and upwardly extending yoke member and having means at its upper end for effecting a pin joint with the structure of an airplane, and an inwardly, rearwardly and upwardly extending strut connected to said yoke mounting and having means for effecting a pin joint with the structure of an airplane, and a casing for the wheel and yoke mounting.

7. A landing gear for airplanes including a wheel and axle, a yoke mounting for the wheel, means on the yoke mounting to receive the axle, said yoke mounting including a vertical yoke member, a shock absorber having means to effect a flexible joint with the structure of an airplane, a rearwardly and upwardly extending yoke member, a strut having means for effecting a flexible joint with the rearwardly and upwardly extending yoke member, and having means at its upper end for effecting a flexible joint with the structure of an airplane, and an inwardly, rearwardly and upwardly extending strut connected to said yoke mounting and having means for effecting a flexible joint with the structure of an airplane.

8. A landing gear for airplanes including a wheel and axle, a yoke mounting for the wheel, means on the yoke mounting to receive the axle, said yoke mounting including a vertical yoke member, a shock absorber having means to effect a flexible joint with the structure of an airplane, a rearwardly and upwardly extending yoke member, a strut having means for effecting a flexible joint with the rearwardly and upwardly extending yoke member, and having means at its upper end for effecting a flexible joint with the structure of an airplane, and an inwardly, rearwardly and upwardly extending strut connected to said yoke mounting and having means for effecting a flexible joint with the structure of an airplane and a casing for the wheel and yoke mounting.

9. A landing gear for airplanes including a wheel and an axle, a yoke mounting for the wheel and including means to receive the axle, said yoke mounting including a vertical yoke member, a shock absorber having means to effect a flexible joint with the structure of an airplane, a rearwardly and upwardly extending yoke member, a strut flexibly connected thereto and having means for flexible connection with the structure of an airplane, and an inwardly, upwardly and rearwardly extending strut connected to said yoke member and having means for flexible connection with the structure of an airplane.

10. A landing gear for airplanes including a wheel and an axle, a yoke mounting for the wheel and including means to receive the axle, said yoke mounting including a vertical yoke member, a shock absorber having means to effect a flexible joint with the structure of an airplane, a rearwardly and upwardly extending yoke member, a strut flexibly connected thereto and having means for flexible connection with the structure of an airplane, and an inwardly, upwardly and rearwardly extending strut connected to said yoke member and having means for flexible connection with the structure of an airplane and a casing for the wheel and yoke mounting.

In testimony whereof I affix my signature.

ELLIOTT DALAND.